United States Patent
Mashinsky

(10) Patent No.: US 7,600,029 B1
(45) Date of Patent: Oct. 6, 2009

(54) SYSTEM AND METHOD FOR GENERATING, MONITORING AND REPORTING PERFORMANCE INFORMATION RELATING TO DATA TRANSMISSIONS

(75) Inventor: Alex Mashinsky, Memphis, TN (US)

(73) Assignee: Governing Dynamics Investment, LLC, New York, NY (US)

( * ) Notice: Subject to any disclaimer, the term of this patent is extended or adjusted under 35 U.S.C. 154(b) by 677 days.

(21) Appl. No.: 10/098,689

(22) Filed: Mar. 15, 2002

Related U.S. Application Data

(60) Provisional application No. 60/276,287, filed on Mar. 15, 2001.

(51) Int. Cl.
*G06F 15/16* (2006.01)
(52) U.S. Cl. .................. 709/228; 709/244; 709/249
(58) Field of Classification Search .............. 705/1, 705/64
See application file for complete search history.

(56) References Cited

U.S. PATENT DOCUMENTS

| | | | |
|---|---|---|---|
| 5,970,477 A * | 10/1999 | Roden ................. 705/32 |
| 6,005,926 A * | 12/1999 | Mashinsky ............ 379/114.02 |
| 6,047,054 A * | 4/2000 | Bayless et al. ......... 379/202.01 |
| 6,295,292 B1 * | 9/2001 | Voit et al. ............... 370/401 |
| 6,449,259 B1 * | 9/2002 | Allain et al. ............ 370/253 |
| 6,639,975 B1 * | 10/2003 | O'Neal et al. ......... 379/112.01 |
| 6,665,395 B1 * | 12/2003 | Busey et al. .......... 379/265.09 |
| 2002/0099818 A1 * | 7/2002 | Russell et al. ........... 709/224 |

\* cited by examiner

*Primary Examiner*—Patrice Winder
(74) *Attorney, Agent, or Firm*—Cohen Pontani Lieberman & Pavane LLP

(57) ABSTRACT

A method and system for monitoring and reporting performance information relating to data transmission. One of a plurality of network service providers associated with the terminating party are identified at the central controller to enable routing of the data transmission. The central controller establishes a connection between an originating party and the identified network service provider for routing of the data transmission to the terminating party. The data transmission is routed by the central controller to the identified network service provider, and the status of a portion of the data transmission is monitored by the central controller while the data transmission to the terminating party occurs and until the connection with the terminating party ends. Performance information associated with the data transmission is generating at the central controller based on the monitored data transmission. The performance information is reported to a third party by the central controller.

30 Claims, 3 Drawing Sheets

| Dialed Number 21 | Time Received 22 | Time Terminated 23 | Network Service Provider 24 | DTMF Signals Detected 25 | Dropped by Network? 26 | Dropped by Terminating Party? 27 |
|---|---|---|---|---|---|---|
| 8XX-NXX-XXXX | 12:02 | 12:10 | AT&T | -- | Yes | N/A |
| 8XX-NXX-XXXX | 14:54 | 15:04 | MCI | 2,0,0 | No | No |
| 8XX-NXX-XXXX | 9:33 | 9:45 | AT&T | 0,0,0,0 | No | Yes |
| 8XX-NXX-XXXX | 8:17 | 9:00 | Sprint | 1,2,1,3 | No | No |

SYSTEM AND METHOD FOR GENERATING, MONITORING AND REPORTING PERFORMANCE INFORMATION RELATING TO DATA TRANSMISSIONS

RELATED APPLICATIONS

This application claims priority from U.S. Provisional Application Ser. No. 60/276,287 filed Mar. 15, 2001.

BACKGROUND OF THE INVENTION

A. Field of the Invention

This invention relates to automated electrical business practices, and relates more particularly to operations research including automated surveying and reporting of service performance.

B. Description of the Related Art

Currently there is little or no information available to consumers regarding the real-time network performance of many network service providers. For example, it is difficult or impossible for a consumer to determine which of three competing long distance companies, for example, drops the fewest calls, or is currently experiencing the least congestion.

Further, there is little or no information available to consumers relating to the level of customer service a business is currently providing its customers, or how that level of service compares with the business's competitors, especially at a quantitative level. For example, it is difficult or impossible for a consumer to determine which of three computer hardware vendors, for example, currently has the shortest hold time on their toll-free helpdesk, or which of the three drop the fewest calls, or which of the three has the most complex set of interactive voice response unit (IVRU) menus through which a customer is required to navigate.

There currently exist many examples of internal call center performance analysis and reporting products that enable call centers to better manage call processing. These include:

E-talk (www.e-talkcorp.com) which offers a suite of products called the e-talk Performance System™, that includes:

E-talk Recorder—allows for the selective recording of voice interaction between agent and customer, as well as agent computer desktop activity, and may include data entry, screen navigation and data retrieval. Recorded information may be synchronized for playback and analysis.

E-talk Advisor—a data analysis product that incorporates information from individual agent customer interactions, automatic call distribution (ACD) data, and the like, to produce detailed reports documenting trends in service and productivity.

E-talk Survey—a voice response unit (VRU) based application that enables call center managers to conduct customer surveys regarding service levels without notifying the associated agent (as described in www.etalkcorp.com/Products/index.cfm?aid=685&CFID=166 030&CFTOKEN=82872371

Chadbourn Marcath Inc. (www.chadbourn.com) offers the Call Center Solutions® product suite—a complete line of management information products that improve the operation of call centers. "Using data from the Automatic Call Distribution (ACD) software on your telephone switch, Call Center Solutions® highlights, translates and delivers actionable ACD information to call center management, supervisors, agents and callers." The product suite includes:

CC Advisor—a real-time queue and agent monitoring designed for supervisors;

CC Analyzer—performs management reporting with real-time historical graphs and reports;

CC Broadcaster—provides real-time displays for agents on televisions, through reader boards, or a window on a LAN workstation.

CC Announcer—provides wait time announcements for callers holding in queue.

Currently there are many Web site performance measurement products and services available. Providers include:

Gomez Advisors, Inc. which monitors, measures and analyzes e-commerce to provide online decision support tools for customers and marketing solutions for businesses. Gomez provides an unparalleled view of online customer experience by combining industry specific expertise, a thoroughly objective and extensive Internet evaluation methodology, and high-quality ratings and reviews of online businesses (as described at http://www.gomeznetworks.com/mktg/about/about1.asp).

"The Gomez Performance Network is a real-time network that provides real-time site and transaction performance metrics from over 50 global regions on 21 backbones across the Internet. Metrics provide HTTP and Transaction details to identify service issues by network, application, and/or provider."

Precise Software Solutions offers enterprise-wide performance management solutions:

"These solutions provide a complete, correlated end-to-end view of performance, both at the Information Technology (IT) component level and at the user-specific "business level". At the business level, Precise measures end-to-end application response time, segments response time by IT component, gauges service quality in business terms, baselines performance, identifies performance deviations, and trends performance levels to facilitate strategic IT planning. At the IT level, the modules of the Precise performance management suite proactively capture, measure, and correlate performance metrics from all critical system components—the database, the operating system, the ERP or custom application server—to provide a holistic view of application performance. Instead of monitoring each system component in isolation, Precise solutions pinpoint the causes of performance problems in context and determine those problems' impact on the application—before those problems impact users (as described in http://www.precise.com/company/). Their products include:

Precise/Insight™—Measures end-to-end application response time and segments response time by IT component.

Precise/SQL®—Delivers total application and database performance management.

Precise/Interpoint™—Optimizes enterprise resource planning (ERP) application performance.

Precise/Pulse!™—Proactively monitors and alerts on system-wide performance.

Precise/Foresight™—Provides a forward looking view of system performance

Savant Diagnostic Center™—Real-time and historic diagnostics"

Keynote Systems provides Web site performance measurement, diagnostic, load-testing and benchmarking services.

"Keynote has systematically built an infrastructure of over 1000 strategically placed measurement computers connected to the Internet via key backbone providers and Internet Service Providers (ISPs) in 120 statistically selected locations across 50 metropolitan areas worldwide. Keynote utilizes these measurement computers to automatically access Web sites and perform transactions form a wide variety of geographic locations 245 hours a day, 7 days a week, and to accurately and realistically generate test loads against Web sites. The measurement data is available in real-time to clients through any standard Web browser.

Keynote provides its clients with Web application performance measurement data such as average page download times from the customer perspective, purchasing processing and credit card transaction processing time, and pre- and post-deployment Web site load testing data. The measurement data allows Web site operators to assess the availability and reliability of their own and their competitors' Web sites from an end-users perspective. The company also offers diagnostic services to help pinpoint and improve problem areas related to performance. With this data in hand, Keynote clients are able to better track and benchmark their online performance, assure customer satisfaction, monitor the competition and proactively address Web site performance problems" (as described in http://www.precise.com/company/).

The present invention addresses certain of the shortcomings in existing technologies.

SUMMARY OF THE INVENTION

The present invention includes a system and method for generating, monitoring and reporting performance information related to the transmission and reception of data communications between at least two parties. The data communications may comprise voice, video, hyper-text transfer protocol (HTTP) and/or other types and protocols of data. In one embodiment, the data transmissions are telephone calls, and may be typical public-switched telephone network (PSTN) calls, or may be Voice over Internet Protocol (VoIP) calls. In some instances, the data communications may relate to business transactions that involve interactive and time-sensitive material. The performance information may include information relating to the level of customer service offered by the terminating party or a network service provider facilitating the data communication.

A system, according to certain embodiments of the present invention, may include a central controller in communication with at least one originating party, at least one network service provider, and/or at least one terminating party. The central system receives a data transmission from the originating party, routes the data transmission to a network service provider, monitors performance information relating to the transmission of the data, and generates reports detailing the performance of the terminating parties and/or network service providers.

It is an advantage of certain embodiments of the present invention to provide a benchmarking service for reporting such performance to consumers by monitoring a company' traffic and performance information. Future trends in the company's performance may also be predicted. Thus, consumers may receive competitive intelligence, whereas previous technologies are limited to allowing companies to track such performance internally.

The above advantages and features are of representative embodiments only, and are not exhaustive and/or exclusive. They are presented only to assist in understanding the invention. It should be understood that they are not representative of all the inventions defined by the claims, to be considered limitations on the invention as defined by the claims, or limitations on equivalents to the claims. For instance, some of these advantages may be mutually contradictory, in that they cannot be simultaneously present in a single embodiment. Similarly, some advantages are applicable to one aspect of the invention, and inapplicable to others. Furthermore, certain aspects of the claimed invention have not been discussed herein. However, no inference should be drawn regarding those discussed herein relative to those not discussed herein other than for purposes of space and reducing repetition. Thus, this summary of features and advantages should not be considered dispositive in determining equivalence. Additional features and advantages of the invention will become apparent in the following description, from the drawings, and from the claims.

BRIEF DESCRIPTION OF THE FIGURES

The invention will be described in greater detail below with reference to the attached drawings, of which:

FIG. 2 is a tabular representation of a performance database maintained by the central server of FIG. 1.

DETAILED DESCRIPTION OF THE PREFERRED EMBODIMENTS

Figure 1:
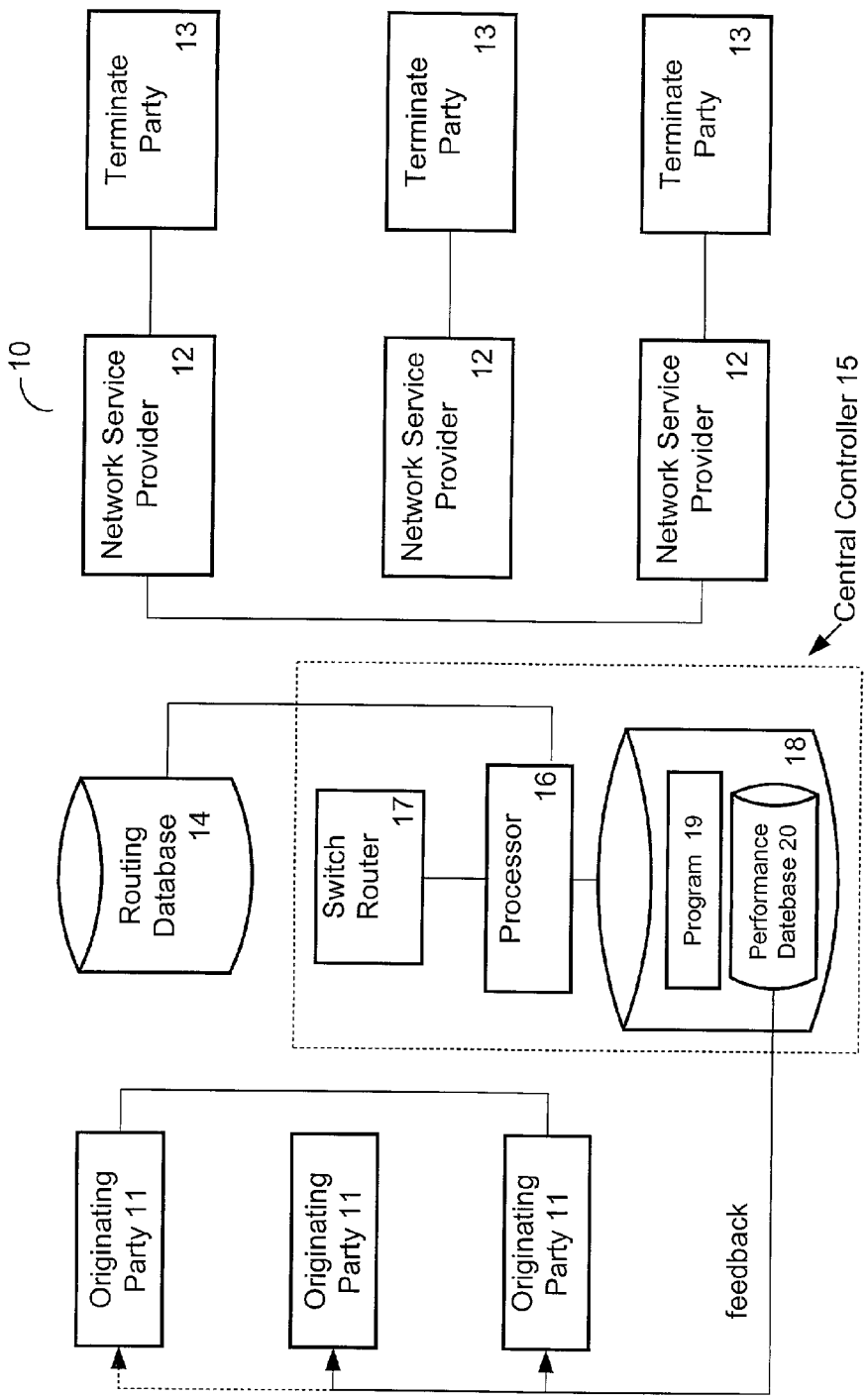
FIG. 1 is a block diagram depicting an exemplary network for use with the present invention, the network including an originating party, a central controller accessing a router database, a terminating party and a network service provider.

One embodiment of the present invention can be illustrated in the following example. An originating party dials a toll-free telephone number in any known manner, including a landline telephone, a wireless phone, and the like. The call is received by a central controller, in this case, a computer server employed by a local telephone exchange carrier. The central controller determines that the call is a toll-free call, based on the dialed number. In order to properly route the toll free call, the central controller queries a toll free database, for example, a Service Control Point (SCP) for the appropriate routing instructions that identify the network service provider associated with the phone number. The central controller routes the call to the identified network service provider, who then connects the call to the terminating party. The central controller monitors the connection between the originating and terminating parties and records performance information associated with the call. Performance information may include whether and how long the call was on hold, whether the call was dropped, who was responsible for dropping the call (e.g. the network service provider or the terminating party), and the like. Further information may include whether the terminating party utilized an IVRU, whether any Dual-Tone Multi-Frequency (DTMF) signals were exchanged, and the like.

The central controller may further prompt the originating party with at least one question in order to gather additional performance information regarding, for example, the level of customer service offered by the terminating party. For example, the central controller may play a recording to the originating party before connecting the call, asking the originating party whether they would agree to answer a few questions over the phone after the call is completed. The customer may respond by, for example, speaking an answer to a voice-recognition unit, pressing a button as directed, and the like. If the customer agrees, the central controller may provide the customer with the questions directly after the call with the terminating party is completed. In some instances, the originating party may just stay on the line and listen to the questions, or the central controller may call the customer back and provide the questions. In some embodiments, the customer may be directed to go to a Web page to answer the questions.

By performing this method multiple times with multiple different originating parties, network communication service providers, and terminating parties, the central controller is able to generate reports detailing the performance and level of customer service offered by the network communication service providers, as well as terminating parties, on a comparative basis. Such reports may prove useful to consumers, research analysts, and the like.

According to certain embodiments of the invention, the originating party may communicate with the central controller using VoIP. The basic method of the invention does not change in these cases, but the central controller may be comprised of additional hardware elements necessary to translate the data received from the originating party from Internet Protocol (IP) to a format suitable for transmission using the PSTN.

FIG. 1 is an overview of an exemplary network 10 used to implement various embodiments of the present invention. The network 10 may allow electronic and/or voice communication between an originating party 11, a network service provider 12, a terminating party 13 and a central controller 15 having a processor 16, a data storage device 18 storing various programs 19 and a performance database 20, and in communication with a switch/router 17 and a routing database 14.

It should be noted that communications and/or transmissions between originating parties 11 and are not limited to a specific suite of protocols. The operating system functionality at the processor 16 will provide network device drivers and requisite protocols allowing for varied protocols and data format carriers such as, but not limited to, TCP/IP, voice, voice-over-IP, UDP, and/or the like. Thus, originating parties may engage communications and/or requests for information through a multitude of facilities and protocols Hypertext Transfer Protocol (HTTP), Secure HTTP (HTTPS), File Transfer Protocol (FTP), and/or the like. Such communications protocols allow originating parties to access varied content such as hypertext (e.g., HTML, XML, etc.), audio files (e.g., MP3, WAV, etc.), video content (e.g., AVI, MPEG(4), etc.), text and/or multimedia files (e.g., Microsoft Word DOC, Adobe Acrobat PDF, etc.), and/or the like. This content may be accessed and resolved through a Universal Resource Locator (URL) via mechanisms such as Domain Name Servers (DNS), Digital Object Identifier (DOI) resolution facilities, and/or the like.

The originating party 11 may be any entity operating a device capable of originating a data transmission consistent with the present invention. For example, the originating party may be a private individual placing a phone call from his or her home, an employee of a business placing a VoIP call by clicking on a "call me" button located on a merchant's Web page, and the like.

The central controller 15 functions to route/switch data transmissions received by an originating party. For example, the central controller 15 may be a local exchange carrier that switches phone calls. The central controller 15 may include a processor 16 (e.g. one of the PENTIUM family of processors manufactured by INTEL CORP.), a telephone switch and/or a router 17 of the type manufactured by Cisco Systems, and a data storage device 18, such as a hard drive of the type manufactured by QUANTUM or any other functional permanent storage device. The data storage device 18 may store one or more programs 19, such as operating system programs and application programs, used to direct the central controller 15 to operate according to the present invention, and a performance database 20 that stores performance information related to data transmissions monitored by the central controller 15.

In one non-limiting example embodiment, the performance database 20 (of FIG. 1) provides a feedback connection to originating parties 11. The main feedback loop from the performance database 20 to the originating parties 11 enables the originating parties to change their future selections. Although the figure shows an alternative embodiment with a connection between the performance database 20 and originating parties 11, this is illustrative of data-flow and not limited to actual signal carrying connections. In another alternative embodiment, the very same feedback may be provided back through the processor 16 and switch/router. There are many possible interconnections between entities depicted in FIG. 1 that may achieve the same operational abilities. Preferred embodiments will vary based on deployment requirements such as customer/vendor needs, geography, scalability and/or budget requirements, and/or the like.

The routing database 14 stores information relating to the network service provider associated with a data transmission, and may be separate from the central controller, or may be maintained by the central controller. For example, the routing database 14 may constitute an SCP and contain information related to toll free phone numbers, in one or more fields (not shown).

The network service provider 12 may be any device capable of transmitting data transmissions from the central controller 15 to a terminating party 13. For example, the network service provider may be maintained by an Inter Exchange Carrier (IXC) such as AT&T, SPRINT, MCI, and the like.

The terminating party 13 may be a device operated by any entity capable of receiving a data transmission from a network service provider 12. For example, the terminating party 13 may be a call center operated by or on behalf of a merchant or service provider.

FIG. 2 is a tabular representation of an exemplary performance database 20, particularly for use with an embodiment involving a toll-free telephone call. In referring to the databases depicted therein, it is important to note that the first row of the databases includes a field header for each field of the database and the remaining rows each correspond to one record of the database. Fields of data, are represented by each column. Further or fewer fields and records of data may be used. The database 20 described herein may be configured into any number of relational databases. In addition, configurations other than database formats may be used to store the data maintained in exemplary database 20. The exemplary database 20 may have the following fields:

Dialed number (21)
Time call is received (22)
Time call terminates (23)
Total connection time (not shown)

Automatic Number Identification (ANI), Billing Number (BN), Caller ID (CLID), IP address in VoIP embodiments, and the like (not shown)
Network service provider ID (24)
DTMF signals detected (25)
Time on hold (not shown)
Dropped by network service provider? (26)
Dropped by terminating party? (27)

Data which is gathered for the above fields may be collected, stored and reporting according to the following exemplary process.

Figure 3:
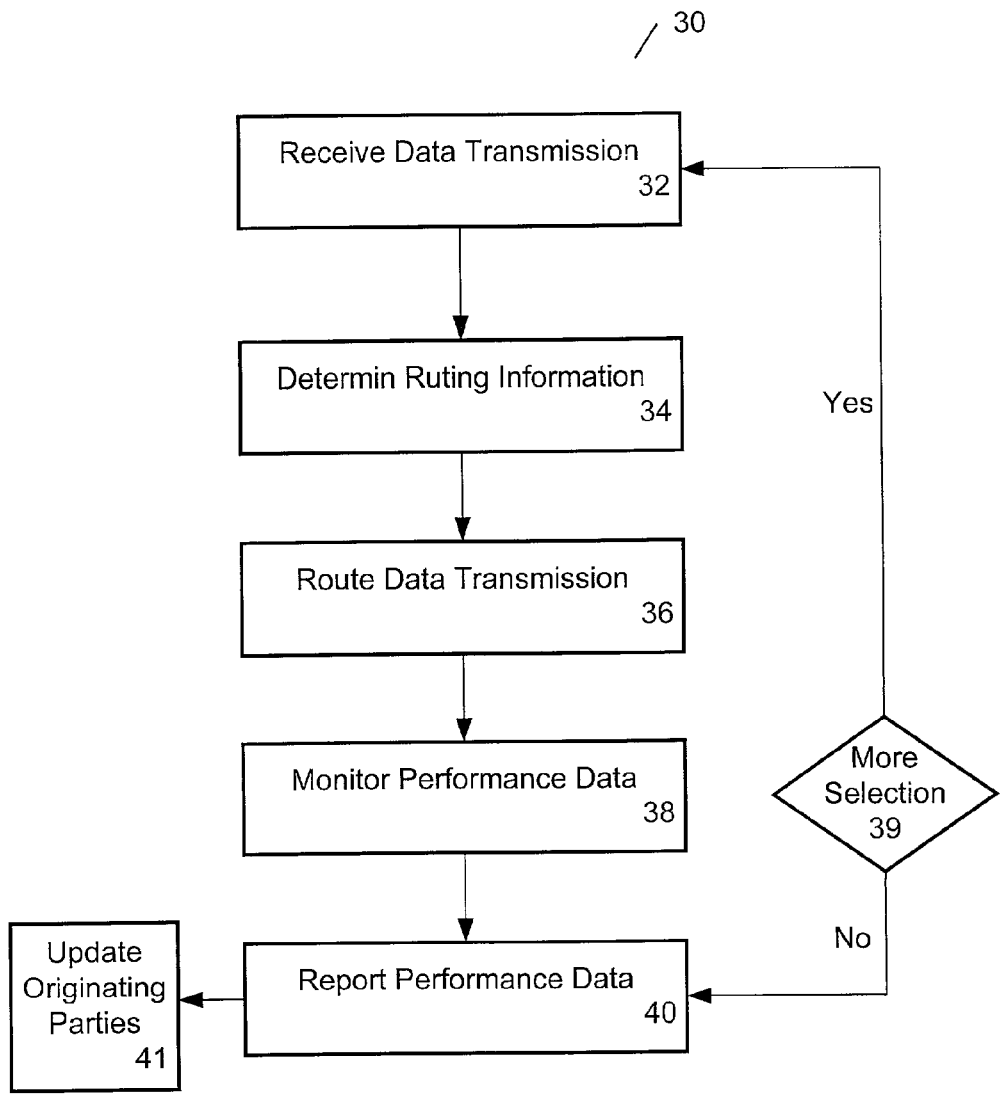
FIG. 3 is a flow chart depicting a method for measuring, storing and reporting performance information to a consumer performed by the central controller of FIG. 1, according to certain embodiments of the present invention.

FIG. 3 is a flow chart depicting one exemplary method 30 according to the present invention. For purpose of example, the flow chart describes a toll free call, though any other type of call may be used.

At step 32, a data transmission is received from an originating party 11. The originating party 11 in communication with the central controller 15 initiates a data transmission that is received by the central controller 15. Communication may take place over a PSTN, the Internet, or another type of electronic communications or computer network. In the case of a toll free phone call, the central controller 15 operates a switch 17 that functions to receive incoming calls. The information received by the switch 17 typically includes both the dialed number and the automatic number identification (ANI), which may be stored, for example, in field 21 of database 20.

In some instances, the central controller 15 may be the originating party 11. In this case, the call is primarily placed in order to gather performance information. For example, the central controller 15 may originate a phone call to a merchant, for example, in order to monitor performance information related to the merchant's ability to receive and handle phone calls, as well as the associated network service provider's ability to deliver the call to the merchant.

At step 34, routing information is determined for the network communication service provider 12 associated with the data transmission. The central controller 15 queries a routing database 14 in order to determine the network service provider 12 to which the data transmission should be routed. In the case of a toll free call, this database typically is maintained at an SCP (service control point), which is periodically updated by the SMS/800 national database.

Next, at step 36, the data transmission is routed to the network service provider 12. Having determined the network service provider 12 associated with the data transmission, the central controller 15 establishes a connection with the identified network service provider 12 by routing or switching the data transmission to that provider 12. For example, if the central controller 15 received a toll free phone call for a number that is based on information received from the routing database 14 associated with, for example, AT&T, then the central controller 15 switches the call to AT&T's network.

Continuing to step 38, the central controller 15 monitors and stores performance information related to the connection and the transmission of the data while the data transmission is in progress. In the example of a toll free phone call, such information may include the time it takes to connect the call to the terminating party 13, the time it takes for the terminating party 13 to answer the call, the DTMF signals transmitted from the originating party 11 (if any), whether the call was dropped and who dropped it, and the like. Such performance information associated with the data transmission is then stored in the appropriate fields of the performance database 20 as described above with respect to FIG. 2.

In one non-limiting example embodiment, upon storing information associated with the data transmission in a performance database 38, the originating party 11 may continue to make selections (similarly as described above) by returning flow 32 to receive more data transmissions form an originating party 39.

Finally, at step 40, the central server 15 generates one or more reports documenting the collected performance information. Stored performance information may then be provided to other parties as reports in a number of different formats. For example, the information may be available online and may be updated at real-time or near real-time rates. Alternatively, the reports may be physically printed or available for download.

In one non-limiting example embodiment, upon generating a report 40, the originating party 11 may be updated with further options, information (status, information responsive to selections, and/or the like), and/or the like 41.

It should be understood that the above description is only representative of illustrative embodiments. For the convenience of the reader, the above descriptions have focused on a representative sample of all possible embodiments, a sample that teaches the principles of the invention. The description has not attempted to exhaustively enumerate all possible variations. That alternate embodiments may not have been presented for a specific portion of the invention or that further undescribed alternate embodiments may be available for a portion is not to be considered a disclaimer of those alternate embodiments. It will be appreciated that many of those undescribed embodiments incorporate the same principles of the invention and others are equivalent. Thus, it is to be understood that the embodiments and variations shown and described herein are merely illustrative of the principles of this invention and that various modifications may be implemented without departing from the scope and spirit of the invention.

In addition the disclosure herein includes other inventions not presently claimed. Applicant reserves all rights in those presently unclaimed inventions including the right to claim such inventions, file additional applications, continuations, continuations in part, divisions thereof, and/or the like.

What is claimed is:

1. A method for monitoring and reporting performance information relating to data transmission, comprising:
   receiving at a central controller a data transmission addressed to a terminating party, the central controller being configured to route data transmission to at least one of a plurality of network service providers;
   identifying at the central controller one of the plurality of network service providers associated with the terminating party to enable routing of the data transmission;
   establishing by the central controller a connection between an originating party and the identified network service provider for routing of the data transmission to the terminating party;
   routing by the central controller the data transmission to the identified network service provider;
   monitoring by the central controller a status of a portion of the data transmission while the data transmission to the terminating party is in progress and until the connection with the terminating party is terminated;
   generating at the central controller performance information associated with the data transmission based on the monitored data transmission; and
   reporting by the central controller the performance information to a third party;
   wherein the performance information includes at least one of a time necessary for the identified network service provider to connect to the terminating party, how long the terminating party took to answer a call, whether an interactive voice response unit was utilized, whether the originating party exchanged dual-tone multi-frequency, how long the call was on hold whether the call was dropped and who was responsible for terminating or dropping the connection to the terminating party.

2. The method of claim 1, further comprising:
storing the performance information generated at the central controller in a database.

3. The method of claim 1, wherein who was responsible for dropping or terminating the call comprises one of the identified network service provider or the terminating party.

4. The method of claim 1, further comprising the step of:
prompting the originating party with at least one question to gather additional performance information.

5. The method of claim 4, wherein the additional performance information comprises a level of customer service offered by the terminating party.

6. The method of claim 4, wherein said prompting step comprises playing a recording to the originating party before connecting a call.

7. The method of claim 6, wherein the originating party remains connected at the central controller after termination of the data transmission with the originating party or the identified network service provider.

8. The method of claim 6, wherein the central controller recalls the originating party after termination of the data transmission.

9. The method of claim 6, wherein said prompting step further comprises directing the originating party to a webpage to answer questions.

10. The method of claim 4, wherein the central controller prompts the originating party to answer questions after termination of the data transmission with the terminating party or the identified network service provider.

11. The method of claim 1, wherein the data transmission comprises a call placed via one of public switched telephone network or voice over Internet protocol network.

12. The method of claim 1, wherein the data transmission includes a toll free number.

13. The method of claim 1, further comprising:
receiving at the central controller a request for reporting the performance information;
wherein the request for reporting is accomplished via one of hyper-text markup transfer protocol, secure hyper-text markup transfer protocol, file transfer protocol, the Internet or the central controller and switch route.

14. The method of claim 1, wherein the reporting performance information to a third party is accomplished via one of hyper-text markup language, extensible markup language, audio files, video content and the central controller and switch route.

15. The method of claim 14, wherein the audio files comprise MPEG3 or WAV files, and the video content comprises AVI or MPEG4 files.

16. An apparatus for monitoring and reporting performance information relating to data transmissions, comprising:
a central controller configured to route data transmission to at least one of a plurality of network service providers; and
a memory in communication with the central controller, the memory for storing a plurality of processing instructions allowing the central controller to:
receive a data transmission addressed to a terminating party;
identify one of the plurality of network service providers associated with the terminating party;
establish a connection between an originating party and the identified network service provider for routing of the data transmission to the terminating party;
route the data transmission to the identified network service provider;
monitor a status of a portion of the data transmission throughout the data transmission until the connection with the terminating party is terminated;
generate performance information associated with the data transmission based on the status of the portion of the data transmission; and
report the performance information to a third party, wherein the performance information includes at least one of a time necessary for the identified network service provider to connect to the terminating party, how long the terminating party took to answer a call, whether an interactive voice response unit was utilized, whether the originating party exchanged dual-tone multi-frequency, how long the call was on hold, whether the call was dropped and who was responsible for terminating or dropping the connection to the terminating party.

17. The apparatus of claim 16, further comprising processing instructions allowing the central controller to:
store the performance information in memory.

18. The apparatus of claim 16, further comprising processing instructions allowing the central controller to:
prompt the originating party with at least one question to gather additional performance information.

19. The apparatus of claim 18, wherein the additional performance information comprises a level of customer service offered by the terminating party.

20. The apparatus of claim 18, wherein said prompt comprises playing a recording to the originating party before connecting a call.

21. The apparatus of claim 20, wherein the originating party remains connected at the processor after termination of the call with the originating party or the network service provider.

22. The apparatus of claim 20, wherein the central controller recalls the originating party after termination of the call.

23. The apparatus of claim 20, wherein said prompt further comprises processing instructions to allow the central controller to:
direct the originating party to a webpage to answer questions.

24. The apparatus of claim 18, wherein the central controller prompts the originating party to answer questions after termination of the data transmission with the terminating party or the identified network service provider.

25. The apparatus of claim 16, wherein who was responsible for dropping or terminating the call comprises one of the identified network service provider or the terminating party.

26. The apparatus of claim 16, wherein the data transmission comprises a call placed via one of public switched telephone network or voice over Internet protocol network.

27. The apparatus of claim 16, wherein the data transmission includes a toll free number.

28. The apparatus of claim 16, further comprising processing instructions for allowing the central controller to:
receive at the central controller a request for reporting the performance information;
wherein the request for reporting is accomplished via one of hyper-text markup transfer protocol, secure hypertext markup transfer protocol, file transfer protocol, the Internet or the central controller and switch route.

29. The apparatus of claim 16, wherein the reporting performance information to a third party is accomplished via one of hyper-text markup language, extensible markup language, audio files, video content and the central controller and switch route.

30. The apparatus of claim 29, wherein the audio files comprise MPEG3 or WAV files, and the video content comprises AVI or MPEG4 files.

* * * * *